United States Patent
Shibayama et al.

(10) Patent No.: US 7,347,629 B2
(45) Date of Patent: Mar. 25, 2008

(54) SEMICONDUCTOR LASER MODULE FOR OPTICAL SCANNER

(75) Inventors: Yasuyuki Shibayama, Hitachinaka (JP); Keiji Kataoka, Hitachinaka (JP); Susumu Monma, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 27 days.

(21) Appl. No.: 11/466,932

(22) Filed: Aug. 24, 2006

(65) Prior Publication Data

US 2007/0058908 A1 Mar. 15, 2007

(30) Foreign Application Priority Data

Sep. 9, 2005 (JP) .......................... P2005-261912

(51) Int. Cl.
*G02B 6/36* (2006.01)
(52) U.S. Cl. ............................. 385/88; 385/92; 385/94
(58) Field of Classification Search ...................... None
See application file for complete search history.

(56) References Cited

U.S. PATENT DOCUMENTS

| | | | | |
|---|---|---|---|---|
| 4,865,410 A | * | 9/1989 | Estrada et al. ................. 385/92 |
| 5,222,170 A | * | 6/1993 | Bargar et al. .................. 385/88 |
| 5,386,488 A | * | 1/1995 | Oikawa ........................ 385/92 |
| 7,221,828 B2 | * | 5/2007 | Nakayama et al. ........... 385/49 |
| 2004/0252951 A1 | * | 12/2004 | Nagasaka et al. ............. 385/88 |

FOREIGN PATENT DOCUMENTS

| JP | A 11-54852 | 6/1989 |
|---|---|---|
| JP | A 2004-253783 | 9/2004 |

\* cited by examiner

*Primary Examiner*—Sung Pak
(74) *Attorney, Agent, or Firm*—Whitham Curtis Christofferson & Cook, P.C.

(57) ABSTRACT

A semiconductor laser module includes a laser holder, a semiconductor laser, a sleeve, an optical fiber, an annular member, and a flexible member. The laser holder has an end portion and is formed with a through-hole opened on the end portion. The semiconductor laser is provided on the laser holder and has a light-emitting portion for emitting a laser beam passing through the through-hole. The sleeve is fixed to the end portion so as to block the through-hole and is formed with an insertion hole. The optical fiber is disposed in the insertion hole and has an incident face. The laser beam is capable of entering the incident face. The annular member is provided on the end portion of the laser holder to encircle outside of the sleeve to be separated from the sleeve with a space between the annular member and the sleeve. The flexible member is affixed to the sleeve and the annular member for covering the space.

23 Claims, 4 Drawing Sheets

● : WELDING LOCATION

● : WELDING LOCATION

●: WELDING LOCATION

●: WELDING LOCATION

● : WELDING LOCATION

● : WELDING LOCATION

SEMICONDUCTOR LASER MODULE FOR OPTICAL SCANNER

BACKGROUND OF THE INVENTION

1. Field of the Invention

The present invention relates to a semiconductor laser module for coupling a laser beam emitted from a light source with an optical fiber, and to an optical scanner employing the semiconductor laser module.

2. Description of the Related Art

Semiconductor laser modules capable of maintaining an efficient coupling between a laser beam emitted from a semiconductor laser and a single-mode optical fiber have been widely used in the field of optical communications.

Generally, the core diameter of single-mode optical fibers decreases as the oscillation wavelength of the semiconductor laser is shortened. The core diameter is on the order of microns when using semiconductor lasers that emit visible light. Hence, precision in positioning an incident portion of the optical fiber and a laser beam emitted from a semiconductor laser, as well as environmental stability, after assembly of a module is even more severe in semiconductor laser modules that emit visible light than in optical communication modules.

When assembling modules that require such high precision in positioning, an optical fiber section is fixed using fixing means such as solder, adhesive, fusion, and welding. As disclosed in Japanese Patent Application Publication No. H11-54852, these fixing means may also be used to hermetically seal the optical fiber section.

Further, since a laser beam focused to an order of microns is constantly irradiated onto the incident end of the optical fiber in the semiconductor laser module, the light energy density is very high, and dust accumulating due to optical trapping of the laser beam (Ashkin, et al.: Observation of a Single-Beam Gradient Force Optical Trap for Dielectric Particles; Opt. Lett. 11, pp. 288-290, 1986) at the core of the optical fiber, which is the focal spot of the laser beam, leads to a drop in coupling efficiency with the optical fiber. In addition to optical trapping for lasers, this problem causes photochemical reactions between the accumulated dust and the laser beam when using a laser having a short wavelength no more than 450 nm near ultraviolet light range, leading to a more serious risk of contaminating the optical fiber.

As disclosed in Japanese Patent Application Publication No. H11-54852, contaminants may be produced when the laser beam polymerizes or degrades hydrocarbons introduced into the atmosphere during the production process or when the laser beam causes a photochemical reaction with airborne siloxane, resulting in the accumulation and deposition of contaminants in the form of SiOx. Hence, the Japanese Patent Application Publication No. H11-54852 proposes the periodic replacement of components that may become contaminated.

Japanese Patent Application Publication No. 2004-253783 proposes a method of controlling contamination on the incident end of the optical fiber. The semiconductor laser module is provided with a package that is hermetically sealed with a flux-free solder, an adhesive that does not contain silicon organics, or through fusion or welding to keep out contaminants.

SUMMARY OF THE INVENTION

However, the conventional method described in the example of Japanese Patent Application Publication No. 2004-253783 has the following problems.

When assembling the semiconductor laser module described above, an optical fiber section is fixed and hermetically sealed using solder, adhesive, fusion, or welding. However, in all of the soldering, fusing, and welding methods, temperature changes in the components being joined are unavoidable. Hence, the components being joined may expand and contract during the sealing process and can produce a positional deviation between these components, degrading the coupling effect by using much soldering, fusing, and welding methods.

When using adhesive, on the other hand, deviations in position commonly occur during assembly due to expansion and contraction of the adhesive during hardening that accompanies polymerization of the adhesive. Further, positions may shift over time due to the release of residual stress accumulated in the adhesive after hardening. Since semiconductor laser module with visible emission in particular require a higher level of precision in positioning the incident portion of the optical fiber and a laser beam than module for optical communication, these shifts in position can greatly reduce the intensity of light emitted from the optical fiber.

In view of the foregoing, it is an object of the present invention to provide a semiconductor laser module having in an optical fiber coupling system for coupling light emitted from a semiconductor laser with an optical fiber via a lens system capable of preventing deformation of components constituting the module and suppressing shifts in position of the optical fiber when assembling the semiconductor laser module, capable of fixing and hermetically sealing the optical fiber section, without contaminating the optical fiber coupling system, and capable of achieving stable coupling efficiency, that is, a stable intensity of light emitted from the optical fiber. It is another object of the present invention to provide an optical scanner equipped with above-mentioned semiconductor laser module.

This and other object of the invention will be attained by a semiconductor laser module including a laser holder, a semiconductor laser, a sleeve, an optical fiber, an annular member, and a flexible member. The laser holder has an end portion and is formed with a through-hole opened on the end portion. The semiconductor laser is provided on the laser holder and has a light-emitting portion for emitting a laser beam passing through the through-hole. The sleeve is fixed to the end portion so as to block the through-hole and is formed with an insertion hole. The optical fiber is disposed in the insertion hole and has an incident face. The laser beam is capable of entering the incident face. The annular member is provided on the end portion of the laser holder to encircle outside of the sleeve to be separated from the sleeve with a space between the annular member and the sleeve. The flexible member is affixed to the sleeve and the annular member for covering the space.

In another aspect of the invention, there is provided an optical scanner including at least two semiconductor laser modules, an optical fiber array, and an optical scanning unit. Each of the semiconductor laser modules includes a laser holder, a semiconductor laser, a sleeve, an optical fiber, an annular member, and a flexible member. The laser holder has an end portion and is formed with a through-hole opened on the end portion. The semiconductor laser is provided on the laser holder and has a light-emitting portion for emitting a laser beam passing through the through-hole. The sleeve is fixed to the end portion so as to block the through-hole and is formed with a insertion hole. The optical fiber is disposed in the insertion hole and has an incident face and an output face. The laser beam is capable of entering the incident face. The annular member is provided on the end portion of the laser holder to encircle outside of the sleeve to be separated from the sleeve with a space between the annular member and the sleeve. The flexible member is affixed to the sleeve and the annular member for covering the space. The optical fiber array has an array of output faces for the at least two semiconductor laser modules. The optical scanning unit scans the beams outputted from the optical fiber array onto a scanning surface.

DESCRIPTION OF THE PREFERRED EMBODIMENTS

First Embodiment

Figure 1:
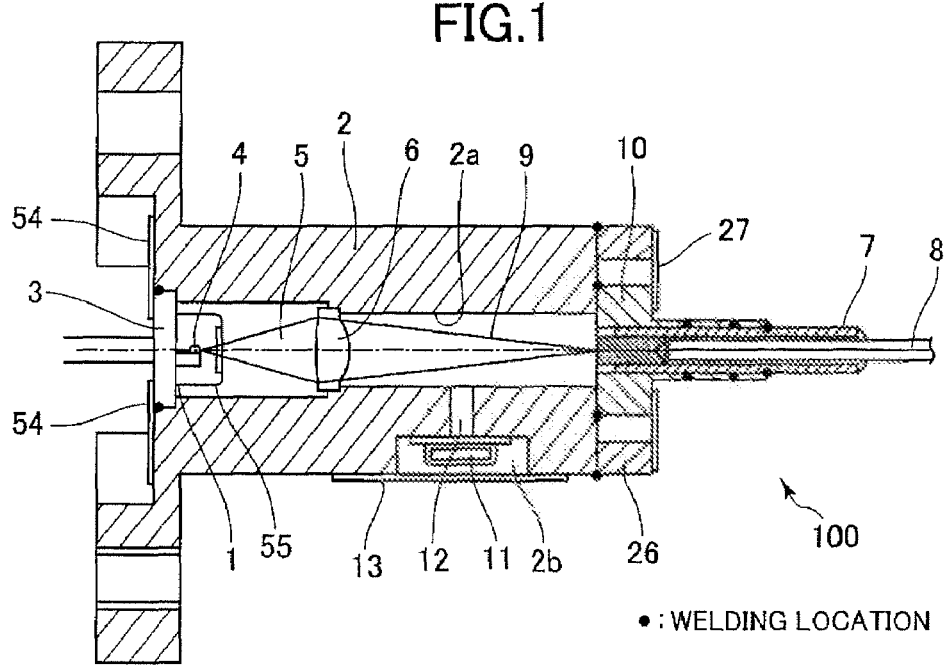
FIG. 1 is a cross-sectional view of a semiconductor laser module according to a first embodiment of the present invention.

A semiconductor laser module according to a first embodiment of the present invention will be described with reference to FIGS. 1 through 4. FIG. 1 is a cross-sectional view showing a structure of a semiconductor laser module 100. In the following description, the right side of the semiconductor laser module 100 in FIG. 1 will be referred to as the front end, and the left side as the rear end.

The semiconductor laser module 100 has a cylindrical laser holding unit 2 in which is formed a through-hole 2a, a recessed part 2b, and a ventilating hole 12. The laser holding unit 2 has an axis. The through-hole extends along the axis. The ventilating hole 12 is in communication with the through-hole 2a and recessed part 2b. A semiconductor laser 1 is a light source provided in the rear side of the laser holding unit 2 so as to fill the through-hole 2a. The semiconductor laser 1 emits a blue laser light near ultraviolet light having an oscillation wavelength of 405 nm. The semiconductor laser 1 is configured of a laser chip 4, an LD cap 55, and a stem 3. The laser chip 4 emits laser light. The stem 3 is disc-shaped, with the entire periphery of the disc bonded to the laser holding unit 2 by laser welding to form a hermetic seal between the inside of the through-hole 2a and the rear end of the laser holding unit 2.

A sealing member 54 is provided on the welded part of the stem 3. The sealing member 54 is configured of a potting resin or a sealing tape for forming a hermetic seal. The sealing tape is a film formed of polyethylene terephthalate (PET) or a composite material of PET and aluminum. An adhesive material is applied to the underside surface of the film layer. Each of the potting resin, PET film, aluminum film, and adhesive is silicon-free so that these members do not generate siloxane. The addition of the sealing member 54 on the welded part of the stem 3 ensures a perfect hermetic seal.

The laser chip 4 and a photosensor (not shown) for receiving a laser beam are hermetically sealed within a space defined by the LD cap 55 and the stem 3. A glass window (not shown) is provided in the LD cap 55 for allowing the laser beam to be emitted externally of the LD cap 55. A lens 6 is disposed inside the through-hole 2a on the front side of the semiconductor laser 1. A sleeve 10 is disposed on the front end of the laser holding unit 2. An optical fiber coupling system is configured of the semiconductor laser 1 and the lens 6.

Figure 4:
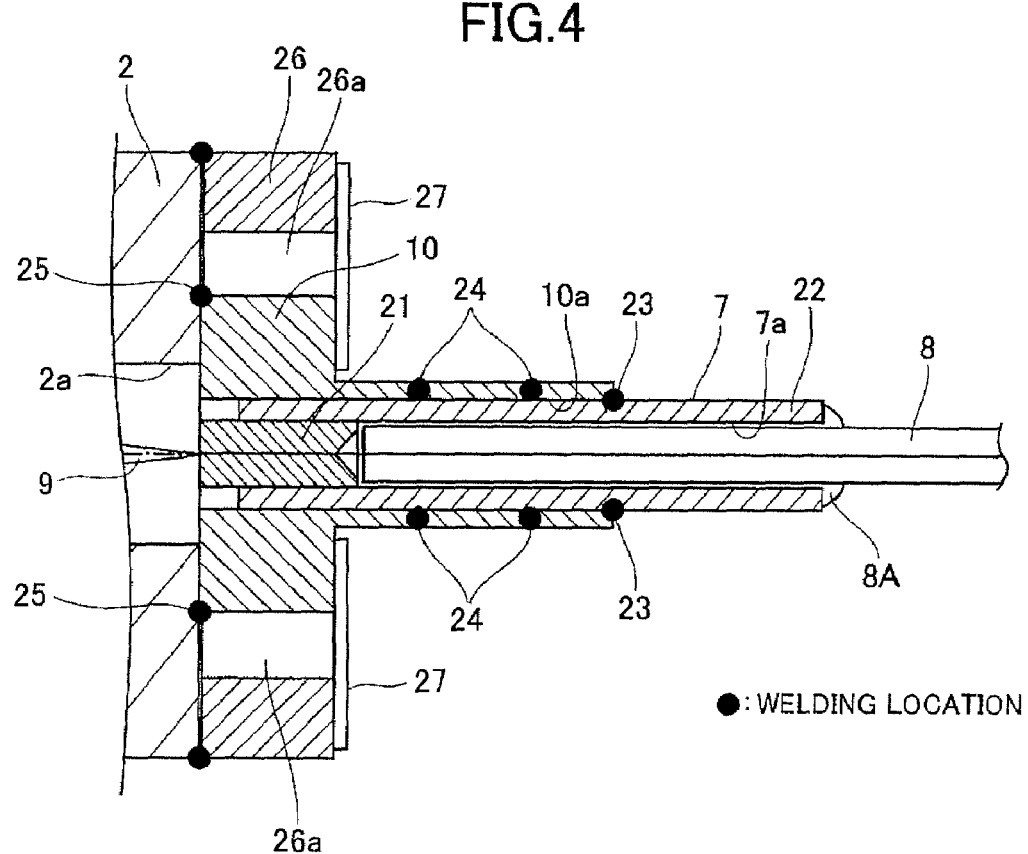
FIG. 4 is an enlarged view of a front end of the semiconductor laser module according to the first embodiment.

As shown in FIG. 4, the sleeve 10 is fixed to the front end of the laser holding unit 2 at welding locations 25 by laser welding. The welding locations 25 do not cover the entire periphery of the sleeve 10. The sleeve 10 has a ferrule insertion hole 10a A cylindrical ferrule 7 is inserted into the ferrule insertion hole 10a. The ferrule 7 has a rear end 21 configured of a ceramic material, and a side portion 22 formed of metal. The sleeve 10 and ferrule 7 are bonded by laser welding at welding locations 23 at the front end of the sleeve 10 and welding locations 24 on the side portion 22 of the ferrule 7 so that the ferrule 7 is held in the sleeve 10. A hermetic seal may be formed between the sleeve 10 and ferrule 7 by providing the welding locations 23 around the entire periphery of the ferrule 7 or by not providing the welding locations 23 around the entire periphery and applying potting resin in areas around the ferrule 7 that have not been laser welded. An optical fiber insertion hole 7a is formed in the ferrule 7, and a single-mode optical fiber 8 is inserted into the optical fiber insertion hole 7a and held in the ferrule 7 by an adhesive 8A applied to the front end of the ferrule 7 and between the side portion 22 and the optical fiber 8.

A ring member 26 is provided on the front end of the laser holding unit 2 and separated a prescribed distance from the outer periphery of the sleeve 10. A hermetic seal is formed between the ring member 26 and the laser holding unit 2 by laser welding, but it is also possible to bond the ring member 26 to the laser holding unit 2 using a potting resin, rather than laser welding. A space 26a is formed between the ring member 26 and the sleeve 10. A flexible member 27 is affixed to the sleeve 10 and the ring member 26 so as to cover and hermetically seal the space 26a formed therebetween. The flexible member 27 is formed of a PET film or a composite material formed of a PET film and an aluminum film and has an adhesive applied to the underside surface thereof. Each of the PET film, aluminum film, and the adhesive used in the flexible member 27 is silicon-free so that these members do not generate siloxane, which can contaminate the optical fiber coupling system. For the same reason, the resin used for attaching the ring member 26 to the laser holding unit 2 should also be silicon-free. An optical fiber section is configured of the sleeve 10, the ferrule 7, the optical fiber 8, the ring member 26, and the flexible member 27.

Figure 2:
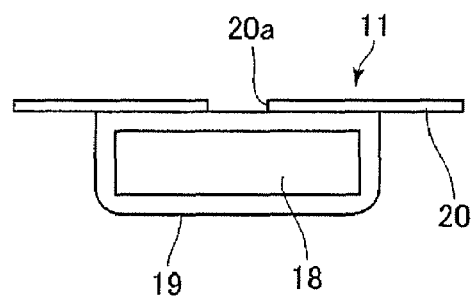
FIG. 2 is a cross-sectional view of an adsorbent unit in the semiconductor laser module according to the first embodiment.

An adsorbing unit 11 is disposed in the recessed part 2b and bonded so as to block the ventilating hole 12. As shown in FIG. 2, the adsorbing unit 11 includes an adsorbent material 18, a sheet member 19, and a sheet 20. The adsorbent material 18 includes activated carbon. The activated carbon can be given an adsorbing capacity suited to material having a desired molecular weight based on the design of the interior structure. As a post-process, the activated carbon can be given an alkali treatment, for example, to improve its capacity for adsorbing acidic materials. Hence, by appropriately designing the interior structure of the activated carbon and treating the activated carbon in a post-process, the activated carbon can adsorb organic and inorganic gases. The adsorbing unit 11 can also be capable of dehumidification by adding moisture absorbent material to the adsorbent material 18.

The sheet member 19 is configured of a porous fluorine material having submicron holes and functions to cover the adsorbent material 18. With the porosity of the sheet member 19, air can pass through the sheet member 19. However, the sheet member 19 prevents components of the adsorbent material 18 (powder of the activated carbon) inside the sheet member 19 from scattering and contaminating the optical system. The sheet 20 is configured of a material in which air cannot pass. A silicon-free adhesive is provided on the underside surface of the sheet 20 so that the adsorbing unit 11 can be fixed to the laser holding unit 2 through the adhesive. An opening 20a is formed in the sheet 20. Hence, the adsorbing unit 11 allows ventilation of the through-hole 2a in the laser holding unit 2 via the opening 20a and the ventilating hole 12.

Figure 3A:
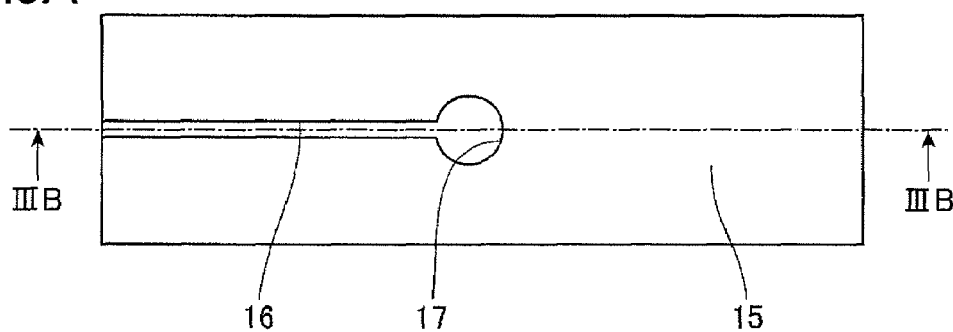
FIG. 3A is a plan view of sealing tape in the semiconductor laser module according to the first embodiment.
Figure 3B:
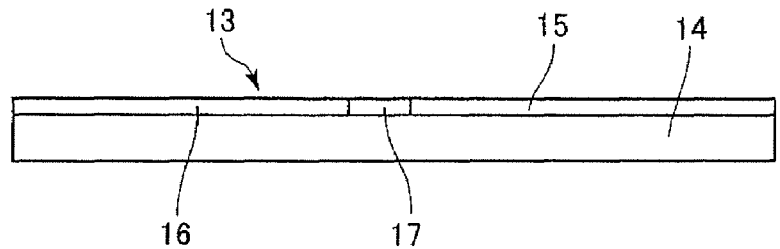
FIG. 3B is a cross-sectional view of the sealing tape along a line IIIB-IIIB in FIG. 3A.

Further, as shown in FIG. 1, a sealing tape 13 is applied to the laser holding unit 2 for covering the recessed part 2b. FIG. 3A is a plan view showing the sealing tape 13 from the laser holding unit 2 side, while FIG. 3B is a cross-sectional view of the sealing tape 13 along a line IIIB-IIIB in FIG. 3A. The sealing tape 13 is configured of a film layer 14 and an adhesive 15. The film layer 14 is formed of either PET or a composite material of PET and aluminum. All of the PET and aluminum of the film layer 14, and the adhesive 15 are silicon-free. Further, a channel 16 and an air inlet 17 are formed in the surface of the sealing tape 13 facing the laser holding unit 2. The channel 16 and air inlet 17 are formed by peeling off portions of the adhesive 15 while leaving the film layer 14 intact A small amount of external air enters the recessed part 2b through the channel 16 and air inlet 17.

With this structure, the laser holding unit 2 is only ventilated with external air that enters via the adsorbing unit 11. Hence, contaminated external air only enters the laser holding unit 2 after being purified. Further, since the air pressure within the semiconductor laser module 100 is always kept substantially equivalent to the external air, it is possible to avoid a pressure differential that can deform the semiconductor laser module 100 and allow air to leak in places with an imperfect seal. Since the semiconductor laser 1 is hermetically sealed independently with the LD cap 55, the laser chip 4 is unaffected when air is ventilated through the channel 16 and air inlet 17.

When the humidity outside the semiconductor laser module 100 is high, the structure described above can prevent the humidity from flowing into and condensing in the semiconductor laser module 100, thereby preventing a drop in the efficiency of light usage in the optical fiber coupling system. Similarly, the semiconductor laser module 100 can capture and remove siloxane suspended in the air and hydrocarbon gas that can adversely affect the properties of the semiconductor laser module 100.

A laser beam 5 emitted from the laser chip 4 is focused on the incident end face of the optical fiber 8 via the lens 6 so as to be incident in a light propagation region of the optical fiber 8 (hereinafter referred to as the "core"). In order to inject an optical fiber irradiating light 9 in the optical fiber 8 with efficiency, it is necessary to match size of a focal spot with the size of the core in the optical fiber 8 as closely as possible. Hence, the lens 6 must convert the light emitted from the laser chip 4 to a size appropriate to the core diameter of the optical fiber 8. Hence, the preferred embodiment employs a lens or a set of lenses having a prescribed magnification determined from the laser chip 4 and the core diameter of the optical fiber 8.

In the first embodiment, the size of the laser chip 4 is always about 1 micron, while the core of the optical fiber is on the order of a few microns when employing a single-mode optical fiber for the visible light range. Hence, before assembling the semiconductor laser module 100, it is necessary to align a focal spot of light emitted from the laser chip 4 with the core of the optical fiber 8 using a high-precision alignment apparatus in order to ensure that the irradiated light is incident on the core of the optical fiber 8 efficiently.

Next, a method of assembling the semiconductor laser module 100 will be described with reference to FIG. 4. The optical fiber 8 is inserted into the optical fiber insertion hole 7a of the ferrule 7 and fixed with the adhesive 8A.

Next, the ferrule 7 holding the optical fiber 8 is inserted into the sleeve 10. While the ferrule 7 is inserted in the sleeve 10, the incident portion of the optical fiber 8 is aligned with the irradiating light 9 to achieve the maximum light intensity in the output portion of the optical fiber 8. Subsequently, the sleeve 10 and ferrule 7 are bonded together by laser welding the welding locations 23 and 24 so that the ferrule 7 is held in the sleeve 10.

After the sleeve 10 and the ferrule 7 are bonded together, the incident portion of the optical fiber 8 is realigned with the irradiating light 9 to achieve the maximum light intensity in the output portion of the optical fiber 8, and the sleeve 10 and laser holding unit 2 are bonded together by laser welding the welding locations 25.

After installing the sleeve 10, the ring member 26 is mounted on the front end of the laser holding unit 2 and laser welded to form a hermetic seal at contact surface of the laser holding unit 2 and ring member 26.

Next, the flexible member 27 is fixed to the sleeve 10 and ring member 26 so as to cover the space 26a described therebetween and to hermetically seal the space 26a.

As described above, the ring member 26 and flexible member 27 ensure the air-tightness of the through-hole 2a formed in the laser holding unit 2. Therefore, it is possible to reduce the amount of welding, adhesive, or the like required to join the laser holding unit 2 and the sleeve 10, suppressing offset in relative position of the laser holding unit 2 and sleeve 10 caused by temperature changes or a polymerization reaction with the adhesive. Since displacement in the rear end of the optical fiber 8 can be suppressed, light emitted from the laser chip 4 can be efficiently injected into the core of the optical fiber 8 in order to output a desired light intensity from the optical fiber 8.

Further, since the ring member 26 is separated from and not in contact with the sleeve 10, no pressure is applied to the sleeve 10 when mounting the ring member 26, thereby not displacing the rear end of the optical fiber B. Since the inside of the laser holding unit 2 is hermetically sealed by applying the flexible member 27 to the sleeve 10 and ring member 26 to cover the space 26a, the laser holding unit 2 can be sealed without temperature changes or polymerization reactions with the adhesive, thereby reducing displacement in the rear end of the optical fiber 8. Further, the flexible member 27 functions as a buffer against external forces that can prevent deformation of the semiconductor laser module 100 caused by pressure applied to the sleeve 10. As described above, when assembling the semiconductor laser module 100, the optical fiber section can be fixed and hermetically sealed, without contaminating the optical fiber coupling system and while preventing deformation in components constituting the semiconductor laser module 100 and suppressing positional shifts in the optical fiber 8. Further, since a pure atmosphere is maintained in the semiconductor laser module 100, the semiconductor laser module 100 can achieve a stable light coupling efficiency, that is, a stable output of light intensity from the optical fiber 8. Further, when compared to the conventional semiconductor laser module, the semiconductor laser module 100 of the preferred embodiment can obtain a more stable output of light intensity from the optical fiber 8 through a simple method that does not require great changes to the structure of the semiconductor laser module 100.

In the preferred embodiment, by laser welding the welding locations 25 between the sleeve 10 and laser holding unit 2 around the entire periphery thereof, the laser welding can also serve to hermetically seal the gap between the contact surfaces of the sleeve 10 and laser holding unit 2. However, too much use of laser welding can cause expansion and contraction in the bonded members due to temperature changes therein that may lead to positional offset. Hence, it is difficult to simultaneously maintain the positioning while hermetically sealing the interior of the semiconductor laser module 100. While there are methods other than welding, such as sealing the contact surfaces of the sleeve 10 and laser holding unit 2 with solder or resin, changes in temperature also occur when using solder, and resin expands and contracts due to polymerization reactions that occur when hardening, which can also contribute to positional deviations. This is problematic because positional deviations occurring at this stage cannot be later corrected through realignment. At the same time, if the sleeve 10 and laser holding unit 2 are not completely sealed, it is not possible to prevent external contaminants from entering the semiconductor laser module 100.

Second Embodiment

Figure 5:
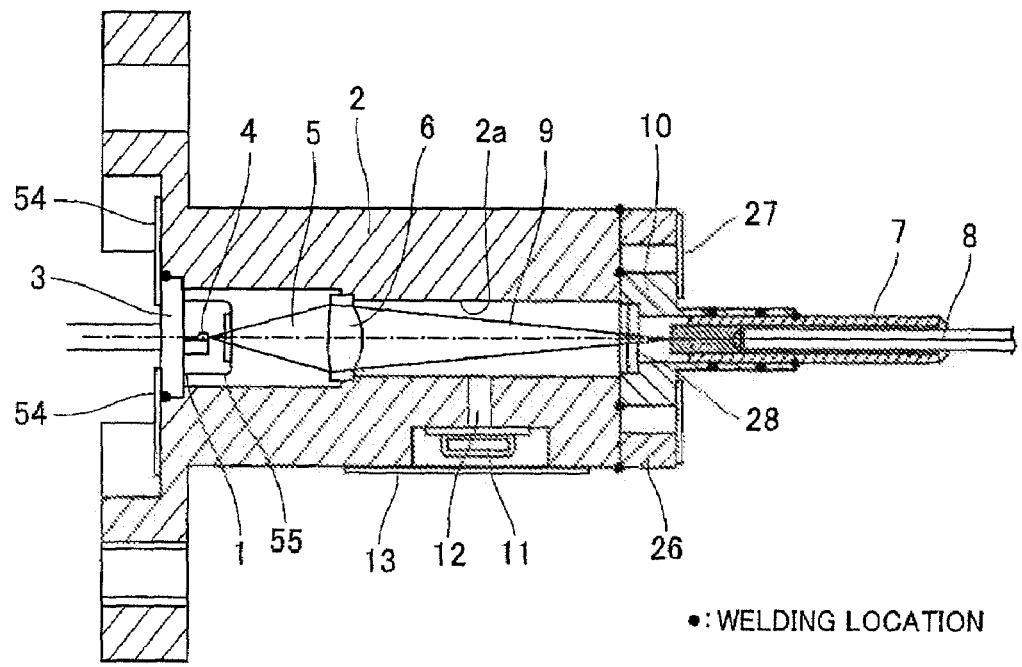
FIG. 5 is a cross-sectional view of a semiconductor laser module according to a second embodiment of the present invention.
Figure 6:
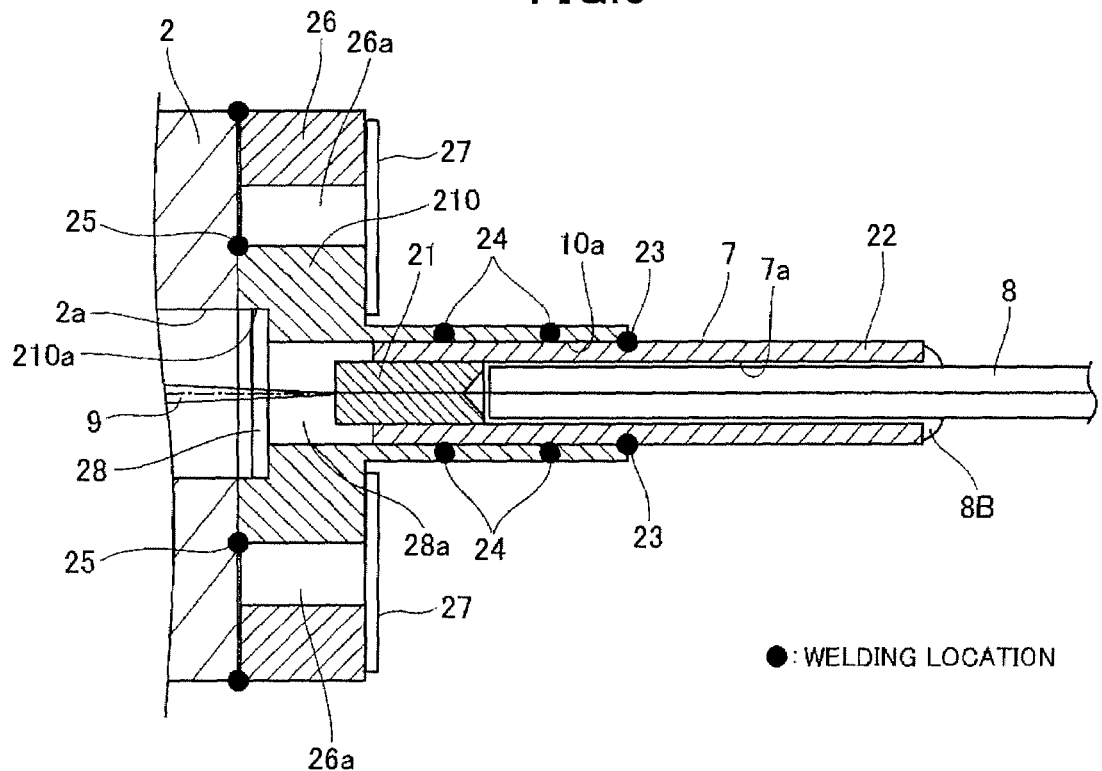
FIG. 6 is an enlarged view of a front end of the semiconductor laser module according to the second embodiment.

Next, a semiconductor laser module according to a second embodiment of the present invention will be described with reference to FIGS. 5 and 6, wherein like parts and components are designated with the same reference numerals to avoid duplicating description. FIG. 5 is a cross-sectional view showing the structure of a semiconductor laser module 200.

In the semiconductor laser 1 according to the second embodiment, the size of the laser chip 4 is always about 0.5-2 μm, while the core of the optical fiber is as little as 4-5 μm when employing a single-mode optical fiber for the visible light range. A recessed part 210a is formed in a region of the sleeve 10 opposing the through-hole 2a. A glass plate 28 is provided inside the recessed part 210a. In the second embodiment, the ferrule 7 is fixed to the sleeve 210 at a forward position with respect to the position where the ferrule 7 is fixed to the sleeve 10 in the first embodiment. Hence, a hermetically sealed space 28a is defined between the rear edge of the ferrule 7 and the glass plate 28. Since the light incident end of the optical fiber 8 can be provided in the space 28a in this way, together with the effects of the 11, this construction doubly prevents contamination of the incident surface of the optical fiber 8. The semiconductor laser module 200 according to the second embodiment also achieves the same effects as the semiconductor laser module 100 in the first embodiment described above.

Next, an optical scanner 300 equipped with the semiconductor laser module 100 or 200 according to the first or second embodiment will be described.

Figure 7:
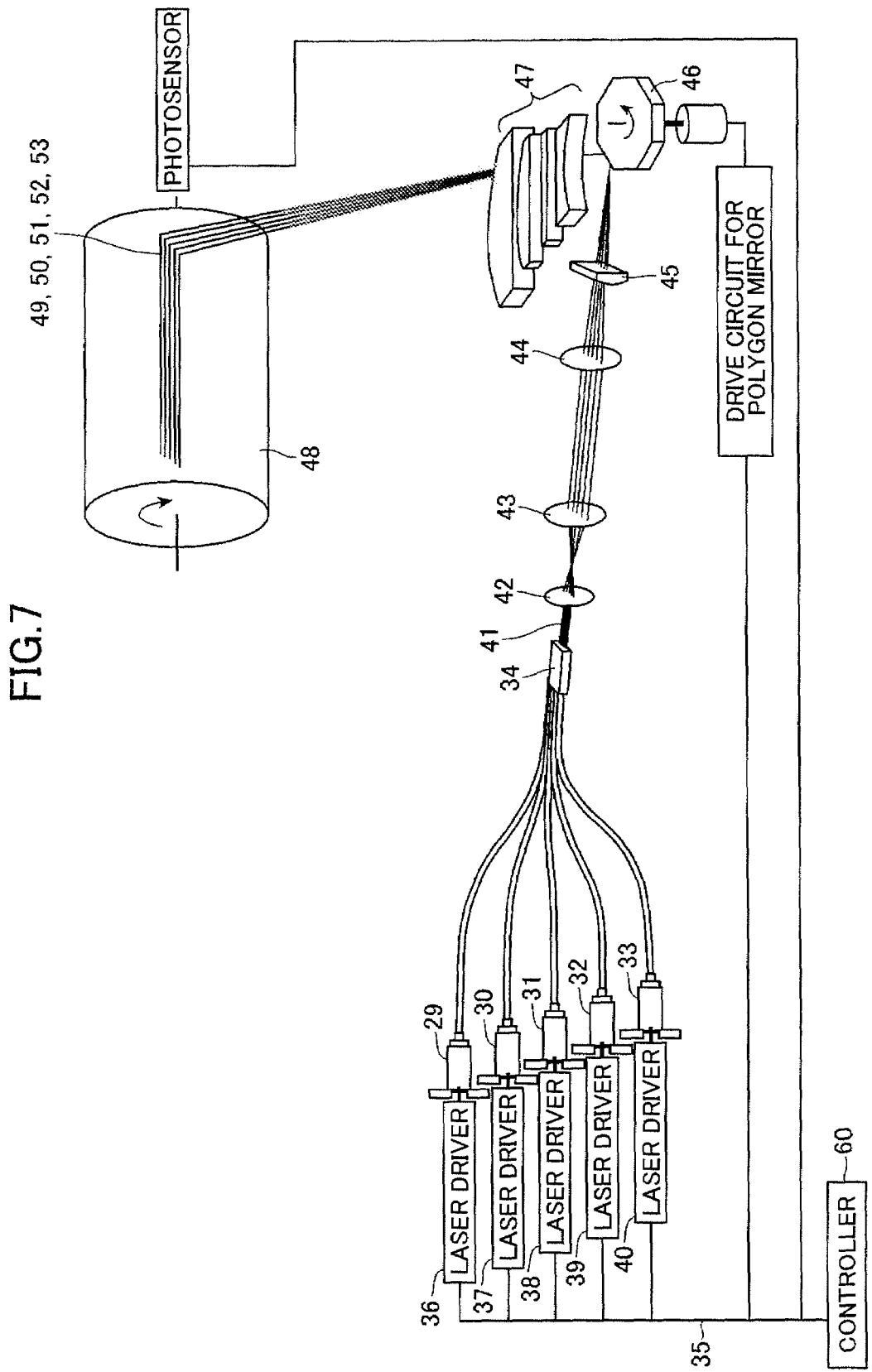
FIG. 7 is a schematic diagram showing an optical scanner equipped with semiconductor laser modules according to the preferred embodiments described above.

FIG. 7 shows the optical system of the optical scanner 300 equipped with the semiconductor laser module 100 or 200 in the preferred embodiment.

In the optical system shown in FIG. 7, the optical scanner 300 employs a plurality of semiconductor laser modules 29-33 identical to the semiconductor laser module 100 or 200 in the preferred embodiments. The output ends of optical fibers in the semiconductor laser modules 29-33 are brought together to form an optical fiber array unit 34. Light emitted from the optical fiber array unit 34 is used as a light source for generating a plurality of laser beams. The semiconductor lasers incorporated in the semiconductor laser modules 29-33 are driven by respective laser drivers 36-40 based on an image data signal 35 outputted from a controller 60. In this way, independently modulated beams 41 can be emitted from the end of the optical fiber array unit 34 (five beams are shown for convenience in FIG. 7).

Light emitted from the optical fiber array unit 34 passes sequentially through lenses 42-45 for shaping the beams. The beams are subsequently deflected by a rotating polygon mirror 46 of an optical deflecting element through scanning lenses 47 of an optical scanning element to form images as rows of spots 49-53 on a photosensitive drum 48. Hence, the photosensitive drum 48 is optically recorded by scanning individually modulated spots.

Hence, by providing the semiconductor laser modules 29-33 similar to the semiconductor laser module 100 or 200 according to the embodiments described above in the optical scanner 300, it is possible to achieve an optical scanner with high quality and high reliability.

While the invention has been described in detail with reference to specific embodiments thereof, it would be apparent to those skilled in the art that many modifications and variations may be made therein without departing from the spirit of the invention, the scope of which is defined by the attached claims A stable and highly reliable light intensity can be emitted from the optical fibers by applying the present invention to a semiconductor laser module not for use with short wavelengths.

Figure 8:
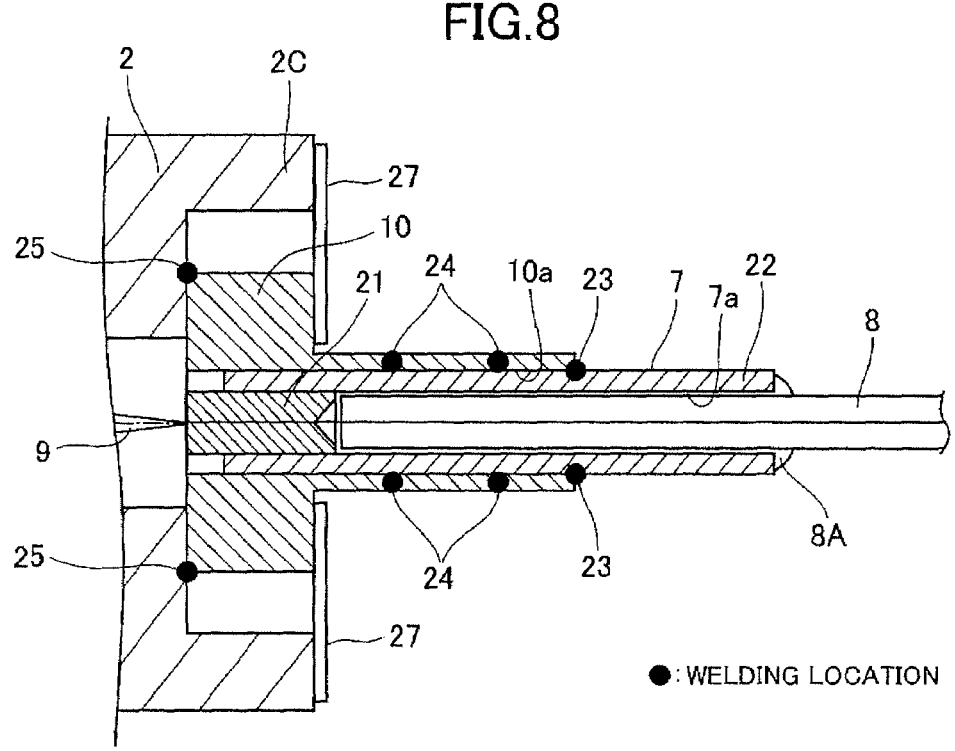
FIG. 8 is an enlarged view of a front end of the semiconductor laser module according to a variation of the embodiments

In the first and second embodiments described above, a space from the lens 6 to the optical fiber 8 is ventilated via the adsorbing unit 11. However, the space from the semiconductor laser 1 to the lens 6 may be ventilated in the same way. Further, the optical fiber 8 in the preferred embodiments is a photonic crystal fiber having a periodic microstructured cross section. Further, in the first and second embodiments described above, the ring member 26 is provided separately from the laser holding unit 2. However, the laser holding unit 2 may be integrally formed with a ring member 2C, as shown in FIG. 8.

What is claimed is:
1. A semiconductor laser module comprising:
  a laser holder that has an end portion and that is formed with a through-hole opened on the end portion;
  a semiconductor laser that is provided on the laser holder and that has a light-emitting portion for emitting a laser beam passing through the through-hole;

a sleeve that is fixed to the end portion so as to block the through-hole and that is formed with an insertion hole;

an optical fiber that is disposed in the insertion hole and that has an incident face, the laser beam being capable of entering the incident face;

an annular member that is provided on the end portion of the laser holder to encircle outside of the sleeve to be separated from the sleeve with a space between the annular member and the sleeve; and a flexible member that is affixed to the sleeve and the annular member for covering the space.

2. The semiconductor laser module according to claim 1, further comprising a ferrule that is disposed in the insertion hole and that is formed with another insertion hole, the optical fiber being disposed in the another insertion hole.

3. The semiconductor laser module according to claim 1, wherein the flexible member includes a sealing tape.

4. The semiconductor laser module according to claim 3, wherein the sealing tape includes a composite tape formed of a polyethylene terephthalate film and a silicon-free adhesive layer.

5. The semiconductor laser module according to claim 3, wherein the sealing tape includes a composite tape formed of a polyethylene terephthalate film, an aluminum film, and a silicon-free adhesive layer.

6. The semiconductor laser module according to claim 1, wherein the annular member is provided separately from the laser holder.

7. The semiconductor laser module according to claim 1, wherein the annular member is formed integrally with the laser holder.

8. The semiconductor laser module according to claim 1, wherein the sleeve comprises a glass member that has transparency to the laser beam and that is interposed between the semiconductor laser and the optical fiber.

9. The semiconductor laser module according to claim 8, wherein the flexible member includes a sealing tape.

10. The semiconductor laser module according to claim 9, wherein the sealing tape includes a composite tape formed of a polyethylene terephthalate film and a silicon-free adhesive layer.

11. The semiconductor laser module according to claim 9, wherein the sealing tape includes a composite tape formed of a polyethylene terephthalate film, an aluminum film, and a silicon-free adhesive layer.

12. The semiconductor laser module according to claim 1, wherein the semiconductor laser has an oscillating wavelength of no greater than 450 nm.

13. The semiconductor laser module according to claim 1, wherein the laser holder is in a cylindrical shape and has an axis, and the through-hole extends along the axis.

14. An optical scanner comprising:

at least two semiconductor laser modules, each of the semiconductor laser modules comprising:

a laser holder that has an end portion and that is formed with a through-hole opened on the end portion;

a semiconductor laser that is provided on the laser holder and that has a light-emitting portion for emitting a laser beam passing through the through-hole;

a sleeve that is fixed to the end portion so as to block the through-hole and that is formed with a insertion hole;

an optical fiber that is disposed in the insertion hole and that has an incident face and an output face, the laser beam being capable of entering the incident face;

an annular member that is provided on the end portion of the laser holder to encircle outside of the sleeve to be separated from the sleeve with a space between the annular member and the sleeve; and a flexible member that is affixed to the sleeve and the annular member for covering the space, an optical fiber array that has an array of output faces for the at least two semiconductor laser modules; and an optical scanning unit that scans the beams outputted from the optical fiber array onto a scanning surface.

15. An optical scanner according to claim 14, wherein each of the semiconductor laser modules further comprises a ferrule that is disposed in the insertion hole and that is formed with another insertion hole, the optical fiber being disposed in the another insertion hole.

16. The optical scanner according to claim 14, wherein the flexible member includes a sealing tape.

17. The optical scanner according to claim 16, wherein the sealing tape includes a composite tape formed of a polyethylene terephthalate film and a silicon-free adhesive layer.

18. The optical scanner according to claim 16, wherein the sealing tape includes a composite tape formed of a polyethylene terephthalate film, an aluminum film, and a silicon-free adhesive layer.

19. The optical scanner according to claim 14, wherein the annular member is provided separately from the laser holder.

20. The optical scanner according to claim 14, wherein the annular member is formed integrally with the laser holder.

21. The optical scanner according to claim 14, wherein the sleeve comprises a glass member that has transparency to the laser beam and that is interposed between the semiconductor laser and the optical fiber.

22. The optical scanner according to claim 14, wherein the semiconductor laser has an oscillating wavelength of no greater than 450 nm.

23. The optical scanner according to claim 14, wherein the laser holder is in a cylindrical shape and has an axis, and the through-hole extends along the axis.

* * * * *